US008446806B2

(12) United States Patent
Akahoshi (10) Patent No.: US 8,446,806 B2
(45) Date of Patent: May 21, 2013

(54) MEDIA RECORD/PLAY DEVICE AND MEDIA RECORD/PLAY METHOD (75) Inventor: Kenji Akahoshi, Yokohama (JP)

(73) Assignee: Hitachi Consumer Electronics Co., Ltd., Tokyo (JP)

(*) Notice: Subject to any disclaimer, the term of this patent is extended or adjusted under 35 U.S.C. 154(b) by 0 days.

(21) Appl. No.: 13/497,486

(22) PCT Filed: Jul. 14, 2010

(86) PCT No.: PCT/JP2010/061864
§ 371 (c)(1),
(2), (4) Date: Mar. 21, 2012

(87) PCT Pub. No.: WO2011/099182
PCT Pub. Date: Aug. 18, 2011

(65) Prior Publication Data
US 2012/0218877 A1 Aug. 30, 2012

(30) Foreign Application Priority Data
Feb. 12, 2010 (JP) .................................. 2010-028393

(51) Int. Cl.
G11B 7/00 (2006.01)
(52) U.S. Cl.
USPC ...................................................... 369/53.15
(58) Field of Classification Search
USPC ............ 369/53.15, 53.1, 53.12, 53.17, 53.16, 369/275.1, 47.1
See application file for complete search history.

(56) References Cited

U.S. PATENT DOCUMENTS

| 6,160,778 | A | 12/2000 | Ito et al. |
| 6,292,445 | B1 | 9/2001 | Ito et al. |
| 6,295,257 | B1 | 9/2001 | Ito et al. |
| 6,304,534 | B1 | 10/2001 | Ito et al. |
| 7,483,349 | B2 * | 1/2009 | Park et al. .................. 369/47.14 |
| 7,742,372 | B2 | 6/2010 | Kwon et al. |
| 2001/0043525 | A1 | 11/2001 | Ito et al. |
| 2005/0265191 | A1 | 12/2005 | Hwang et al. |
| 2007/0121460 | A1 | 5/2007 | Kwon et al. |

FOREIGN PATENT DOCUMENTS

| JP | 2-087370 | 3/1990 |
| JP | 2000-322835 | 11/2000 |
| JP | 2009-517795 | 4/2009 |
| JP | 2009-245586 | 10/2009 |
| WO | WO-00/054274 A1 | 9/2000 |
| WO | WO-2007/061188 A1 | 5/2007 |

OTHER PUBLICATIONS

"DVD-RAM technology," published by Triceps Co., Ltd. 2000, with English Translation.
Chinese Office Action with English Translation issued in Chinese Application No. 201080041358.9 mailed Jan. 22, 2013.

* cited by examiner

Primary Examiner — Nabil Hindi
(74) Attorney, Agent, or Firm — McDermott Will & Emery LLP (57) ABSTRACT In the case where a spare area management method using an NAP of a spare area on a recordable medium is applied to a spare area management method of a spare area on a rewritable medium, in order to alleviate a recording stop caused by retry over in a replacement process or unnecessary conversion processes in a record/reproduce device, the NAP is updated in a format process or in the replacement process in such a way as to avoid defective blocks within the spare area which is registered as Unusable Cluster or Usable Cluster Type 2 entries on the DFL.

16 Claims, 7 Drawing Sheets

| Status1 | Defective Cluster first PSN | Status2 | Replacement Cluster first PSN | |
|---|---|---|---|---|
| 0010 | 0 | 0000 | A | SPR |
| 0010 | 0 | 0000 | B | SPR |
| 0010 | 0 | 0000 | C | SPR |
| 0010 | 0 | 0000 | D | SPR |
| 0010 | 0 | 0000 | E | SPR |
| 0010 | ... | 0000 | ... | |

| Status1 | Defective Cluster first PSN | Status2 | Replacement Cluster first PSN | |
|---|---|---|---|---|
| 0000 | a | 0000 | A | RAD |
| 0000 | b | 0000 | B | RAD |
| 0000 | c | 0000 | C | RAD |
| 0000 | d | 0000 | D | RAD |
| 0010 | 0 | 0000 | E | SPR |
| 0010 | ... | 0000 | ... | |

MEDIA RECORD/PLAY DEVICE AND MEDIA RECORD/PLAY METHOD

INCORPORATION BY REFERENCE

The present application is the U.S. National Phase under 35 U.S.C. §371 of International Application No. PCT/JP2010/061864, filed on Jul. 14, 2010, which in turn claims priority from Japanese Patent Application No. 2010-028393 filed on Feb. 12, 2010, the contents of which are hereby incorporated by reference into this application.

TECHNICAL FIELD

The present invention relates to a media record/play or reproduce device and a media record/play or reproduce method and particularly to handling rules on a method of using a spare area in a format process or a replacement process in a device which performs a record/reproduce operation by using a replacement process data area on a rewritable medium.

BACKGROUND ART

As background art references, there are Patent Literatures 1 and 2 and Non Patent Literature 1. The abstract of Patent Literature 1 describes as follows:
A recording medium, and a method and apparatus for recording defect management information on the recording medium are disclosed. The method for recording defect management information of a recording medium includes recording a defect entry on the recording medium, wherein the defect entry includes a first field that can identify a defect entry type, a second field recording position information of a defect area within a user data area, and a third field recording position information of a spare area within an area for replacement, and recording position information corresponding to the second field and/or the third field in accordance with the defect entry type decided by the first field, wherein, in the case of a defect entry type having no corresponding position information, the corresponding field is set to zero (0).

Further, the abstract of Patent Literature 2 describes that the problem to be solved is "to make a write-once medium rewritable and to facilitate effective use of a main data area and increase in record/reproduce performance." Further, the abstract describes the solution as follows:
In the write-once medium, a selected area, such as a postscript point in the main data area, is used for a replacement destination area. Moreover, sequential recording range information allows determination of whether recording has been made or not on a target address of a writing request and the like. Furthermore, replacement management information for defect replacement and data rewriting is integrated to coexist. This allows defect replacement and data rewriting without allocation of a fixed spare area. Moreover, when the spare area is allocated, if shortage occurs in the capacity usable for the replacement process in the spare area, the selected area such as the postscript point in the main data area is used for the replacement destination area.

Moreover, Non Patent Literature 1 discloses a technique related to a defect management method.

CITATION LIST

PATENT LITERATURE 1: JP-T-2009-517795
PATENT LITERATURE 2: JP-A-2009-245586
NON PATENT LITERATURE 1: "DVD-RAM Technology" edited by Triceps Planning Department and issued by Triceps Co., 2000

SUMMARY OF INVENTION

Technical Problem

At present, record/reproduce devices are available that record data by irradiating an optical disk-shaped recording medium with a laser beam by using a semiconductor laser, wherein the optical disk-shaped recording medium is typified by a CD-R/RW (CD Recordable/Rewritable), DVD±R/RW (DVD±Recordable/Rewritable Disk), DVD-RAM (DVD-Random Access Memory), and a Blu-ray Disc® (hereinafter, referred to as a BD).

A defective part (defect) is sometimes generated on a rewritable or recordable optical disk medium, for example, by a scratch caused in a part of the medium, fingerprints, contamination, or recording film degradation. If data is recorded in such a defective part, there is a great likelihood that data cannot be read.

As one of the methods for avoiding recording in a defect on the disk surface and prolonging the disk life, the defect management method, called Linear Replacement, is provided for recording data, not in the defective part, but in a spare area (alternative recording area) reserved on the same optical disk. This method, which is applied to a DVD-RAM, is described in pages 29 to 31 in Non Patent Literature 1. This technology is applied also to a BD and if, while data is recorded in the user data area on a cluster basis, data cannot be recorded in a cluster or data is successfully recorded in a cluster but cannot be successfully verified, the cluster is recorded in a spare area provided on the disk. A cluster is the minimum recording block unit in the present invention. Further, the address information on a detected defective cluster, the address information on a cluster recorded in the spare area, and a DFL entry indicating the type of the defect are registered as the defect lists (DFL) in the management area provided on the disk. Several types of DFL entries are defined such as an SPR (Spare) entry, an RAD (Re-Allocated Defect) entry, a CRD (Contiguous Re-allocated Defect) entry, a PBA (Possibly Bad Area) entry, an NRD (Non-Re-allocatable Defect) entry, and an Unusable entry. This is described in Patent Literature 1.

Moreover, in a recordable medium, data is not rewritable into a spare area in which data has been recorded once, and therefore a first block address in the spare area, in which data is to be recorded next, is recorded in the management information area in the medium and replacement process is performed while recording data from the first block address. This is described in Patent Literature 2. On the other hand, in a rewritable medium, the spare area can be re-used even in the case where data has already been recorded in the medium, and therefore "the first block address indicating a block to be used next within the spare area," which is used in the recordable medium, is not used, but "the type of the DFL entry indicating a next-usable cluster within the spare area" is used for determination. In addition, the DFLs are sorted to manage a cluster to be used next within the spare area. This is described in Patent Literature 2. Moreover, the rewritable medium is able to be physically formatted (hereinafter, referred to as "format process") again. In the case of performing the format process again on a medium in which the spare area has already been used, there are various cases of handling DFL entries already registered within the spare area in the format process: Quick Reformat in which all DFL entries registered as defective are converted to "DFL entries indicating that the clusters were defective in the past" (for example, SPR with status 2=0100, PBA with status 2=0100, etc.); No Certification in which all used DFL entries are completely formatted; Full Certification in which the cluster status is checked for all clusters in a medium and a DFL entry conversion is performed as needed; and Quick Certification in which the cluster status is checked for only the clusters of defective DFL entries in a medium and a DFL entry conversion is performed as needed.

In the case of changing the method of managing clusters within a spare area which can be used next in a rewritable medium from "the method with the DFL entry type" to "the method with a first block address to be used next within a spare area" which is used in a recordable medium, however, there is no reference of the way of handling the first block address such as a method of updating the first block address to be indicated after the format process or the first block address during recording.

In a rewritable medium managed by the first block to be used next within the spare area indicating the first block address of the block, the initial value of the first block address after the first format process in the medium whose format process is not yet performed ought to indicate the first block address of the spare area. Thereafter, in the case of recording user data while performing a replacement process for the medium, the first block address is updated according to the status of use of the spare area. Discussion will be made here on a case of formatting a medium, in which data has already been recorded, again.

Several types of format processes are defined for BD and there are a plurality of conversion patterns before and after initializing the DFL entries in the format process. Supposing that defective clusters continue from the beginning of the spare area in a consecutive range or in a range with a plurality of such defective clusters, and if the first block address indicates the first block address of the defective block, it means that an NAP does not indicate the address at which data is to be recorded next, which is contrary to the name. This causes problems such as a recording stop caused by retry over after repeating a recording retry process for the defective block and unnecessary conversion processes in a record/reproduce device.

Therefore, it is an object of the present invention to solve the above problems and to alleviate a recording stop caused by retry over and unnecessary conversion processes in a record/reproduce device, focusing on a method of initializing the first block address in a format process and an updating method during replacement process.

Solution to Problem

The above object is achieved by the present invention described in the claims by way of example.

Advantageous Effects of Invention

According to the present invention, an appropriate recording operation is achieved, thus improving user-friendliness.

Other objects, features, and advantages of the present invention will be apparent from the following detailed description with reference to accompanying drawings.

DESCRIPTION OF EMBODIMENTS

Hereinafter, an embodiment of the present invention will be described with reference to drawings.

Embodiments

Hereinafter, an embodiment of the present invention will be described with reference to drawings.

Figure 1:
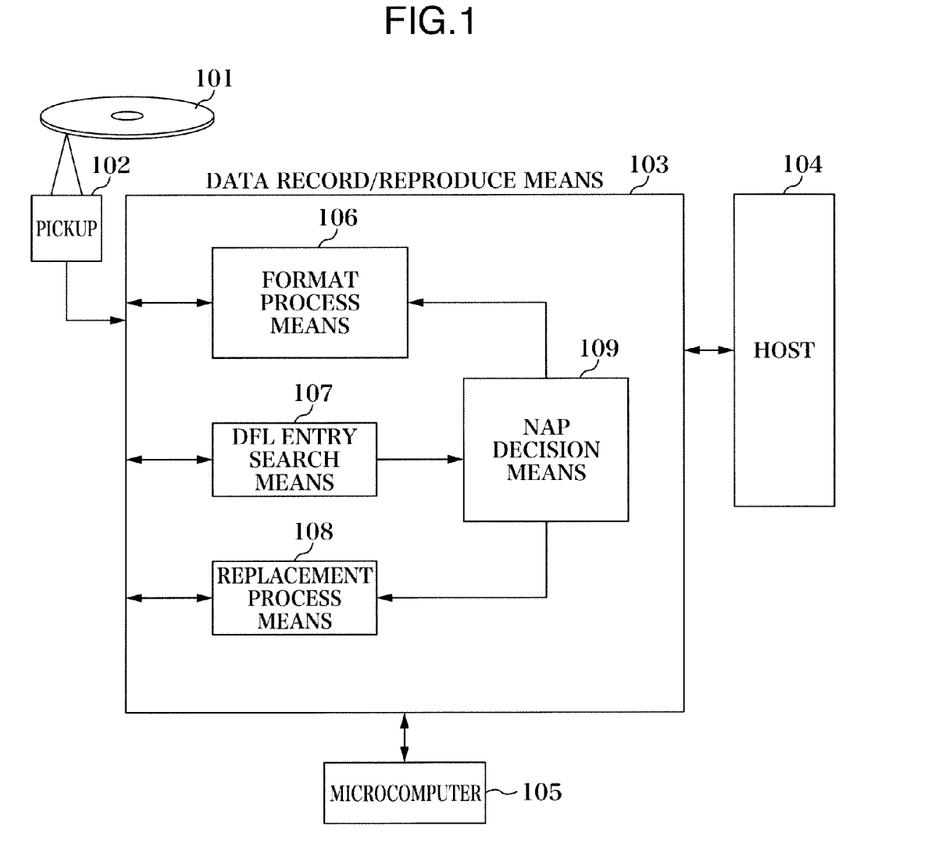
FIG. 1 is a block diagram illustrating a configuration of a record/reproduce device according to an embodiment of the present invention.

FIG. 1 is a block diagram illustrating a configuration of a record/reproduce device according to an embodiment of the present invention. Hereinafter, the configuration will be described with reference to drawings.

In FIG. 1, reference numerals 101, 102, and 103 indicate: an optical disk, which is capable of recording and reproducing data, having a user data area, a disk management information area, and a replacement process data area on the disk; a pickup which reads a recording signal from the optical disk 101; and data record/reproduce means, respectively. Although not illustrated in FIG. 1, the data record/reproduce means 103 includes all means necessary to output data read from the pickup to a host 104, which is an external device, or to record data from the host 104 onto the disk, such as servo control means for controlling the pickup 102, means for modulating and demodulating data, means for correcting errors, temporary storage means for temporarily storing data, temporary storage means control means for controlling the temporary storage means, and host interface means for exchanging information to or from the host 104 according to a protocol, which is typified by an ATAP 1 (AT Attachment Packet Interface). A reference numeral 105 indicates a microcomputer which controls the data record/reproduce means thereof. Reference numerals 106, 107, 108, and 109 indicate: format process means which performs a physical format process of the disk 101; DFL entry search means, which is capable of searching for a DFL entry recorded in the management information area on the disk 101 indicating the replacement status of each cluster within the user data area or the spare area; replacement process means which performs a so-called replacement process of recording a replacement cluster in the spare area if a cluster is determined to be defective during recording or reproducing in the user data area on the disk 101; and NAP decision means which decides the first block address of a cluster in which data is to be recorded next within the spare area, namely NAP (Next Available PSN), respectively. Hereinafter, the first block address of the cluster in which data is to be recorded next within the spare area is referred to as "NAP." Although the NAP is assumed to be present in each spare area, this embodiment focuses on an ISA0, which is one of spare areas, and assumes that the term NAP indicates the NAP in the ISA0 for convenience. There is no problem, however, even if the NAP is applied to any spare area.

Figure 2:
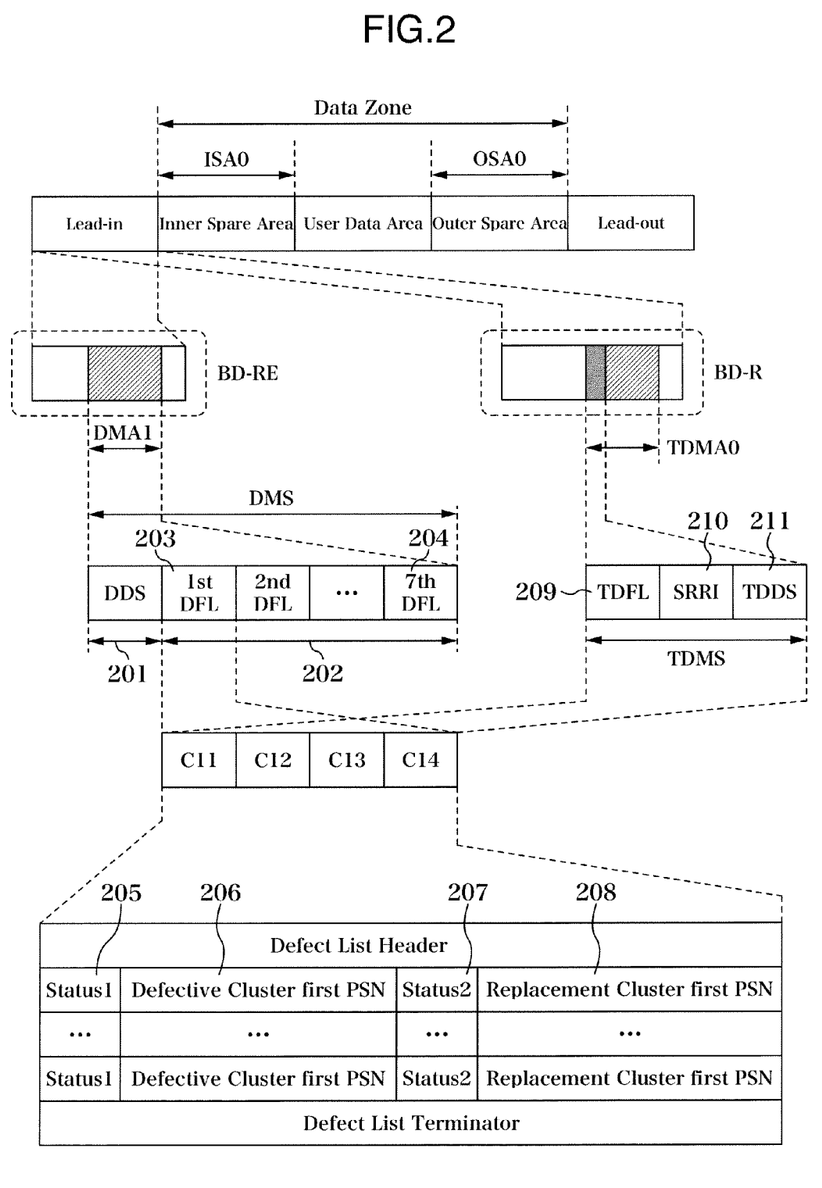
FIG. 2 is a diagram illustrating the structure of an entire BD-RE/R disc.

FIG. 2 is a diagram illustrating the structure of an entire BD-RE/R SL (Single Layer) disc. Both of the BD-RE and BD-R discs are each largely composed of three areas: a Lead-in area, a Data Zone area, and a Lead-out area. The Data Zone area further includes the ISA0 (Inner Spare Area 0) area, which is an inner spare area, the User Data Area, and the OSA0 (Outer Spare Area 0) area, which is an outer spare area. The DMA (Disc Management Area), in which management information in the recording status is recorded, is provided in both the Lead-in area and the Lead-out area. Although DMAs 1 to 4 are defined in the BD-RE SL, only DMA1 is illustrated in this example for ease of explanation. Moreover, in the BD-R disc, the recording status of the disc is managed in a TDMA (Temporary Disc Management Area) until the disc is finalized. The TDMA can be provided in the Lead-in area, the ISA0 area, and the OSA0 area, as TDMA0, TDMA1, and TDMA2, respectively. In this example, the TDMA1 and the TDMA2 included in the ISA0 and the OSA0 are omitted for ease of explanation. After the finalization, data is recorded in the DMA similarly to the BD-RE disc. First, the DMA area of the BD-RE disc will be described.

The DMA area is composed of a disc management structure (DMS). The DMS includes a disc definition structure (DDS) 201 and a temporary defect list (DFL) 202. The DDS includes DFL allocation information and the disc management information such as the ISA0 and OSA0 capacity information. The DFLs are used primarily as lists for managing the replacement locations corresponding to defective locations on the disc.

The following describes the DFLs more in detail. The DFLs of the BD-RE SL are composed of the 1st position of DFL indicated by the reference numeral 203 to the 7th position of DFL indicated by the reference numeral 204. Out of those positions, only one position is effective in practice. At the start of recording, the 1st position 203 is used first. After data is overwritten many times in the block and, if data cannot be recorded properly in the block and is verified to be defective, the effective position moves to the 2nd position of DFL. Therefore, once all positions, the 1st to 7th positions of DFL, are used up, any more DFL registration cannot be performed and so data involving recording in the spare area cannot be written. Even if the 1st to 7th positions of DFL are not used up, however, there is a case in which DFL registration cannot be performed and, as a result, data involving recording in the spare area cannot be recorded. The following describes that case. As shown in the figure, one position is composed of four clusters and DFL registration is performed using one to four clusters.

The DFLs are stored between the Defect List Header and the Defect List Terminator. The format of DFL registration is composed of a Status 1 area 205, a Defective Cluster first PSN that indicates the replacement source address 206, a Status 2 area 207, and a Replacement Cluster first PSN that indicates the replacement destination address 208. Both of the Status 1 and Status 2 each represent the type of a DFL entry. In the BD-RE, all spare areas are secured as SPR (Spare) entries (with Status2=000b) in the format process of a first medium to indicate that the spare areas are usable as spare areas. For example, if a replacement process is performed in units of a cluster during recording, the values of the Status 1 and Status 2 areas are each 000b (in binary) to indicate RAD. A reference numeral 206 indicates the first block address of a defective cluster, and a reference numeral 208 indicates the first block address of a replacement destination cluster. The DFL lists each composed of the areas 205 to 208 are sorted: if the DFL lists are each composed of RAD and SPR entries, the DFL lists are arranged in the order of RAD and SPR. In the case where the record/reproduce device performs a replacement process subsequently, the record/reproduce device is able to quickly search for usable clusters registered as effective SPR entries by searching the sorted DFL lists.

Subsequently, the TDMA of the BD-R will be described. The TDMA area is composed of a plurality of temporary disc management structures (TDMS). The TDMS is the unit of an updating (recording) operation. Further, the TDMS includes a temporary defect list (TDFL) 209, sequential recording range information (SRRI) 210, and a temporary disc definition structure (TDDS) 211. The TDFL 209 is primarily used as a list to manage a replacement location for a defective location on the disk. The TDFL 209 is formed of a DFL list composed of the areas 205 to 208 in the same manner as the BD-RE DFL configuration. The SRRI 210 primarily includes management information on a record area equivalent to a track of a CD, which is called a sequential recording range (SRR). Further, the TDDS 211 includes TDFL allocation information and disk managing information such as the capacities of ISA0 and OSA0. The NAPs in ISA0 and OSA0 are P_IAS0 (next available PSN of ISA0) and P_OAS0 (next available PSN of OSA0) and this kind of information is included in the TDDS 211.

Figure 3A:
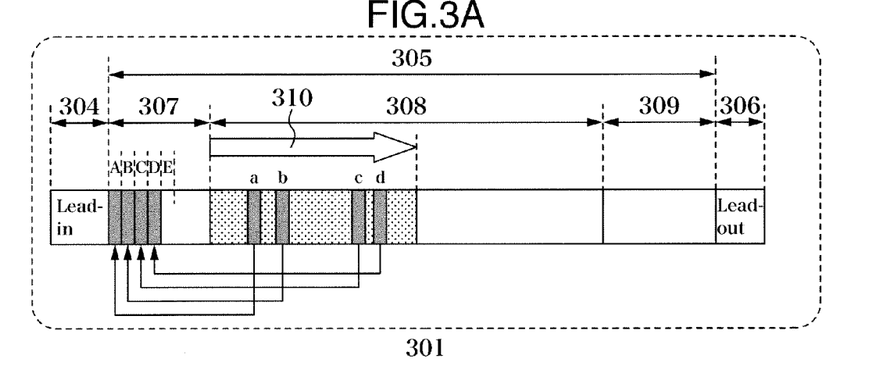
FIG. 3A is a diagram for describing a defect processing method for BD-RE/R.
Figure 3B:
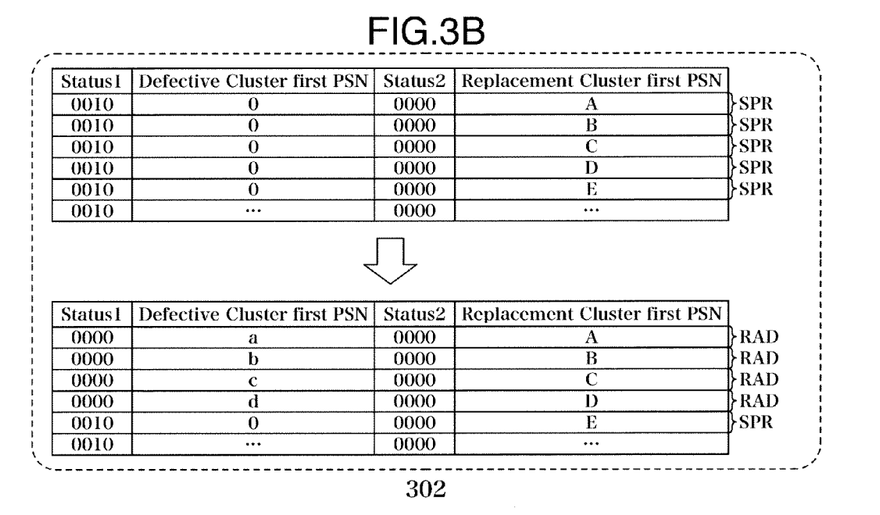
FIG. 3B is a diagram for describing a defect processing method for BD-RE/R.
Figure 3C:
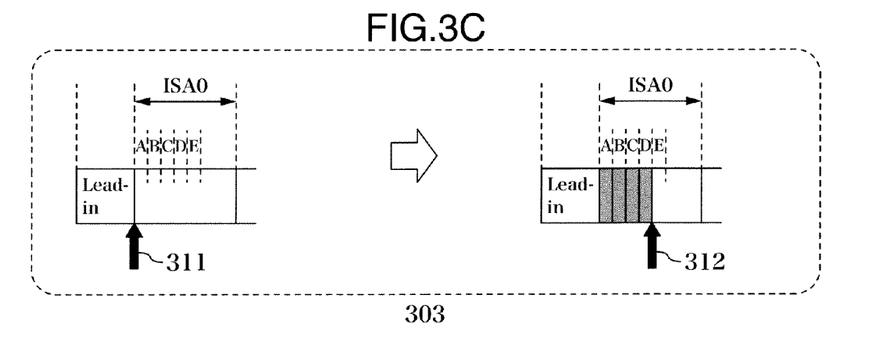
FIG. 3C is a diagram for describing a defect processing method for BD-RE/R.

The following describes a method of using the spare areas on the BD-RE/R with reference to FIGS. 3A to 3C.

First, a method of using the spare areas on the BD-RE will be described using diagrams 301 and 302 of FIGS. 3A and 3B.

A reference numeral 301 indicates a diagram illustrating the configuration of a disc formatted so that the spare areas ISA0 and OSA0 are secured. As illustrated in FIG. 2, the disc is composed of a Lead-in area 304, a Data Zone area 305, and a Lead-out area 306, and ISA0 (304) is secured in the disc inner periphery side of the data zone area 305 and OSA0 (309) is secured in the disc outer periphery side. Those areas are used for the spare areas of defects detected while data is being recorded. The diagram 301 illustrates an example of a replacement process wherein defective clusters a, b, c, and d are detected during recording into a user data area 308 in the direction indicated by an arrow 310 in FIG. 3A and the replacement process has been performed with the defective clusters as A, B, C, and D in the ISA0 of the spare area 307 in the RAD entries. The following describes how the DFL changes in this situation, using the diagram 302. The upper half of the diagram 302 illustrates a DFL immediately after the format process. As described with reference to FIG. 2, SPR entries are registered in all spare areas during the first format process in the BD-RE and therefore the SPR entries are registered as usable clusters in order from the first block address A of ISA0 through B, C, and D to E. If A, B, C, and D are used as replacement destination clusters of a, b, c, and d, the DFL is as illustrated in the lower half of the diagram 302. It is understood that Status 1 is changed to an RAD entry and the cluster in ISA0 to be used next is changed to E.

Subsequently, a method of using spare areas in the BD-R will be described using the diagrams 301 and 303 of FIGS. 3A and 3C. The status of the diagram 301 is assumed as the status of the replacement process in the same manner as in the BD-RE. A difference from the BD-RE will be described using the diagram 303. Unlike the BD-RE, the SPR entry is not registered during format process, but a spare area to be used next is managed with an NAP in the BD-R. This address is present for each spare area. In the case of 301, two NAPs, namely the NAP for ISA0 and the NAP for OSA0 are present. The number of NAPs increases according to the number of spare areas. In a state where the spare area is not yet in use immediately after the format process, a first block address 311 of the cluster A is indicated as the first block address that can be used next within the spare area ISA0. At the time point when replacement processes for all of a, b, c, and d are completed, a first block address 312 of the cluster E is indicated as the first block address that can be used next within the spare area ISA0. From this, it is understood that the cluster in ISA0 to be used next is the cluster E. As described in the above, the address management method in the spare area to be used next differs between the BD-RE and the BD-R.

Figure 4:
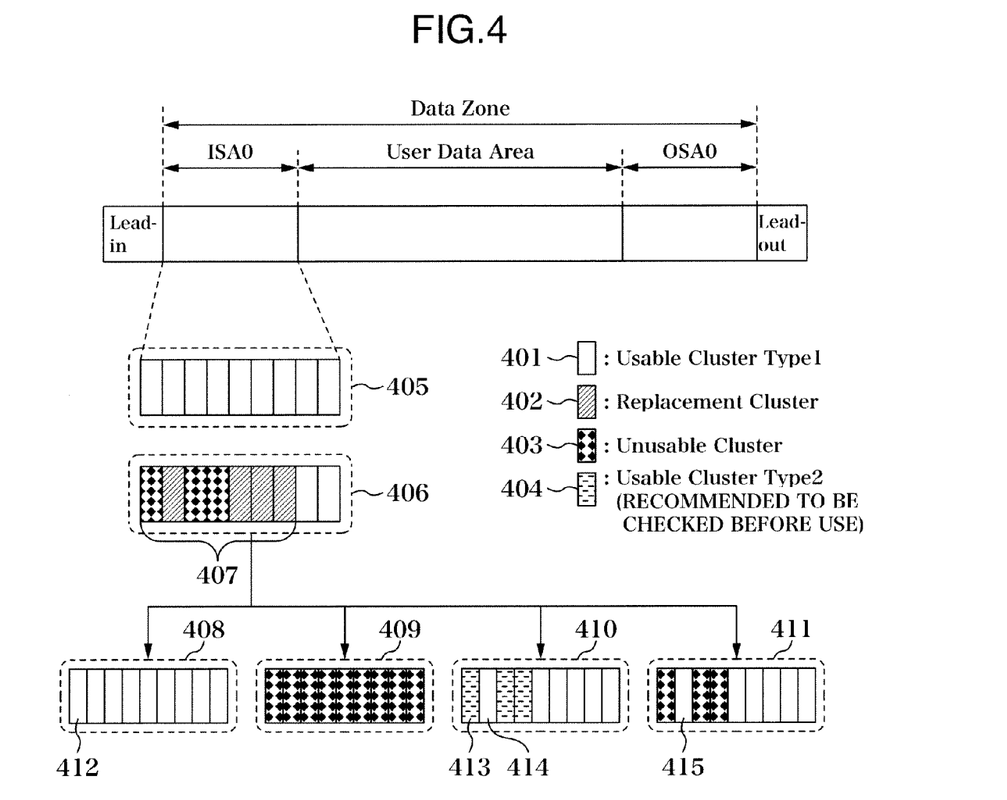
FIG. 4 is a diagram for describing a re-format process for BD-RE which has already been formatted.

Here, consideration is made on a case where the address management method within the spare area with the NAP employed in the BD-R is applied to the BD-RE, and problems of the method of using the spare data area in the situation will be described with reference to FIG. 4. FIG. 4 is a diagram illustrating a change in the DFL entries in the spare area in the format process in the BD-RE. The format process includes both of a physical format process and a certification process of checking the status of a medium and updating defect information of the medium on the basis of the check result. Moreover, FIG. 4 illustrates the BD-RE SL disc and the definitions of the respective areas are as described hereinabove. Reference numerals 401 to 403 indicate explanatory notes showing the statuses of the clusters within the spare area: Usable Cluster Type 1 401, which indicates that the cluster is usable (for example, SPR entry with Status2=000b); Replacement Cluster 402, which indicates spare data is actually recorded (for example, RAD entry with Status2=000b); Unusable Cluster 403, which indicates that the cluster is highly likely to be unusable due to a defective cluster; and Usable Cluster Type 2 404, which indicates that the cluster is highly likely to have been defective in the past and therefore the cluster should be checked after recording before use (for example, SPR entry with Status2=0100b).

First, a reference numeral 405 indicates the status of ISA0 immediately after performing a format process on a BD-RE medium on which no data is recorded. The ISA0 area is composed of only Usable Cluster Type 1 entries, which indicates that all clusters are likely to be usable.

Description is made here on a large difference between the BD-RE and the BD-R with respect to a format process. Since the BD-R is a recordable medium, the format process is performed only once for one recording medium. Therefore, the NAP value within the spare area cannot return from the current value. The BD-RE medium is rewritable, however, and therefore the medium can be re-used or re-formatted. In addition, there are a plurality of ways of performing the format process of the BD-RE for each DFL entry conversion method, and various combinations are supposable particularly for the DFL conversion methods. Therefore, four cases are supposed as examples. The status 406 is observed after a replacement process or a format process, with respect to clusters having the DFL entries configured as illustrated at 407. In this case, the area is composed of Replacement Cluster and Unusable Cluster entries. Consideration is made on performing a format process on the medium having a spare area with these DFL entries. The example indicated by 408 shows an instance of converting all clusters to Usable Cluster type 1 entries independently of whether each cluster is in the status of Replacement Cluster or Unusable Cluster. In this case, the cluster within the spare area in which data is to be recorded next is a cluster 412.

An example 409 is a case where all clusters in the spare area are treated as Unusable Cluster entries as a result of Full Certification of the spare area. ISA0 includes no cluster within the spare area in which data is likely to be recorded next in this case, and therefore an ISA0 full flag indicating that the entire ISA0 is already in use is set to make it unusable. Moreover, in the example 409, even if the Unusable Cluster entry is change to the Usable Cluster Type 2 entry, exactly the same description as the above is applicable.

An example 410 is a case where clusters having been Unusable Cluster entries at 406 are converted to Usable Cluster Type 2 entries and other clusters shown as Replacement Cluster entries are converted to Usable Cluster Type 1 entries. In this case, the cluster within the spare area in which data is to be recorded next is a cluster 414 registered first as Usable Cluster Type 1. Although a cluster 413 registered as Usable Cluster Type 2 may be used as a cluster within the spare area in which data is to be recorded next, the cluster has been defective in the past and therefore there is a possibility that data cannot be recorded in the cluster, which needs to be checked after the cluster is used. An example 411 is a case where the clusters having been unusable at 406 remain as they are and other clusters shown as Replacement Cluster entries are converted to Usable Cluster Type 1 entries. In this case, the cluster within the spare area in which data is to be recorded next is a cluster 415.

These four examples are illustrative only, and other combinations of conversions are possible according to the specification of the record/reproduce device. In the case of re-formatting a medium including a spare area having the DFL entry status as illustrated at 406, there are various results of converting existing DFL entries as described above.

Consideration is made here on where NAP should be set in the statuses 408 to 411 in the case of introducing the spare area management method with the NAP of the BD-R into the BD-RE. With the introduction of the NAP indicating a usable cluster within the spare area, it is assumed to stop the use of "SPR entry with Status2=000b indicating a usable cluster," which has been used in the conventional BD-RE. As has been described in the above, the cluster in which data is to be recorded next varies as indicated by 412 to 415 in the statuses 408 and 411, and therefore an inconvenience occurs in "the specification in which the NAP is returned to indicate the value of the beginning of the spare area," which is the specification for the format process of the BD-R.

Figure 5A:
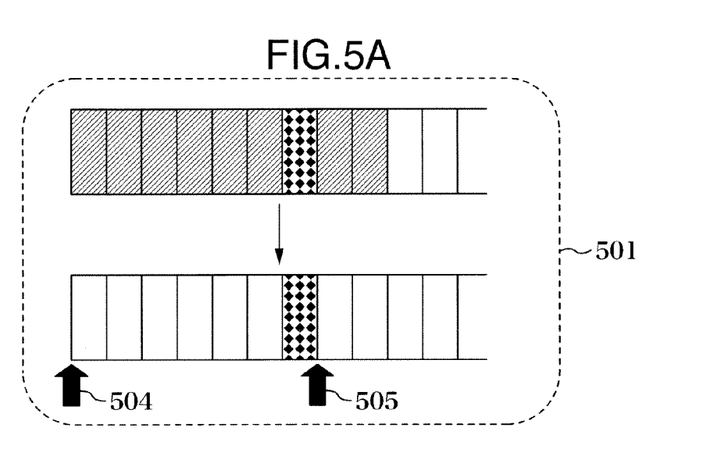
FIG. 5A is an example of NAP allocation after the format process for solving the problem.
Figure 5B:
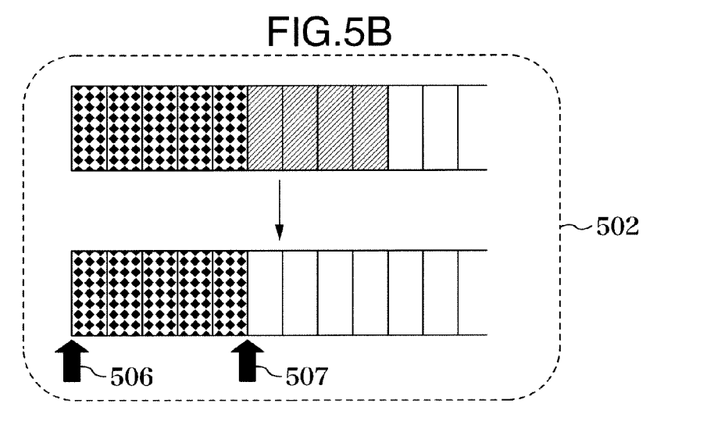
FIG. 5B is an example of NAP allocation after the format process for solving the problem.
Figure 5C:
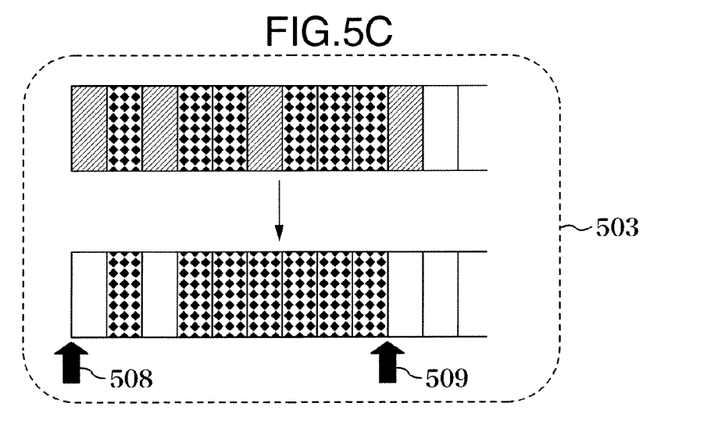
FIG. 5C is an example of NAP allocation after the format process for solving the problem.

This will be described with reference to FIGS. 5A to 5C. The relationship between the upper half and the lower half of the diagrams 501 to 503 shows a relationship between before and after a format process. The upper half of each diagram shows a status before the format process and the lower half of the diagram shows a status after the format process. Moreover, the explanatory notes of the patterns of the printing employed in the diagrams are the same as those in FIG. 4. The diagram 501 illustrates an example that only clusters shown as Unusable Cluster entries remain after the format process and other clusters are converted to Usable Cluster Type 1 entries. Consideration is made on a case where the NAP is returned to an initial value, namely the position indicated by 504 in the same manner as the BD-R in the format process. As long as a recording retry process is possible, the NAP can be progressed to the position indicated by 505 even if the replacement process proceeds and the NAP proceeds from the position 504 and reaches the beginning of the cluster registered as an Unusable Cluster entry and data cannot be recorded into the cluster registered as an Unusable Cluster entry. Alternatively, the record/reproduce device is able to figure out clusters registered as Unusable Cluster entries in advance by searching DFL and therefore is able to record data into a cluster other than Unusable Cluster. If the NAP matches the first block address of an Unusable Cluster entry in the figure, the NAP may be changed to the position 505. Therefore, there is no problem even if an Unusable Cluster entry is present in a position subsequent to the NAP, the NAP is set in such a way as to indicate the beginning of the cluster that can be used first within the spare area. In addition, in the case where the Unusable Cluster entry is of Usable Cluster Type 2 in the lower half of the diagram 501, quite the same description as the above is applicable and the NAP is set to the position 504.

Subsequently, the status of a diagram 502 will be discussed. The status of the diagram 502 is a case where clusters registered as Unusable Cluster entries continue from the cluster including the beginning. Consideration is made on a process of initializing the NAP, in other words, returning the NAP to a position 506 similarly to the BD-R in the format process. In the case of the diagram 502, five clusters registered as Unusable Cluster entries continue in succession. The following discusses on a record/reproduce device which attempts to record data into a cluster registered as an Unusable Cluster entry, for example, on the assumption that up to three times is permitted as the number of retries of recording in the spare area with a recording location changed.

If all clusters registered as Unusable Cluster entries in the lower half of the diagram 502 are clusters in which data cannot be recorded, the number of contiguous defective clusters exceeds the number of recording retries before reaching the beginning 507 of the cluster in which data can be recorded first when viewed from the beginning of the spare area, and therefore retry over occurs and the recording stops. This is caused by returning the NAP to the position 506 in the re-format process. On the other hand, the following discusses a record/reproduce device which does not record data into a cluster registered as an Unusable Cluster entry. Since the NAP is indicated by 506, the record/reproduce device needs to change the NAP from the position 506 to the position 507 inside before recording in order to avoid Unusable Cluster entries, and the record/reproduce device cannot start recording if the NAP remains in the position 506, which is the NAP position indicated first. Therefore, in a status where one or more clusters registered as Unusable Cluster entries continue including the first cluster in the spare area as described above, the NAP is initialized to the position 507. This enables a replacement process to be performed without performing unnecessary recording retires. Moreover, in the case where a part or all of the Unusable Cluster entries are of Usable Cluster Type 2 in the lower half of the diagram 502, quite the same description as the above is applicable and the NAP is set to the position 507. Further, if all clusters within the spare area are treated as Unusable Cluster or Usable Cluster Type 2 entries as in the example 409 in FIG. 4, ISA0 does not include any clusters within the spare area in which data can be recorded, and therefore the NAP is a value indicating that the value of the cluster within the spare area in which data is to be recorded next is invalid, such as, for example, FF FF FF FFh.

The following discusses the status of the diagram 503. The status of the diagram 503 is a case where clusters registered as Unusable Cluster entries are allocated in a plurality of units. This status can be treated in the same manner as the example of the diagram 502 and the NAP is initialized to the position 508, which corresponds to the first usable cluster. Moreover, also in the case where a part or all of the Unusable Cluster entries are of Usable Cluster Type 2 in the lower half of the diagram 503, quite the same description is applicable and the NAP is set to the position 508.

As described above, when a re-format process is performed for a medium which has already been formatted, attention is focused on the status of the DFL entry registration before the format process and the NAP is decided avoiding the clusters registered as Unusable Cluster or Usable Cluster Type 2 entries, thereby enabling a replacement process without performing unnecessary retries.

Figure 6A:
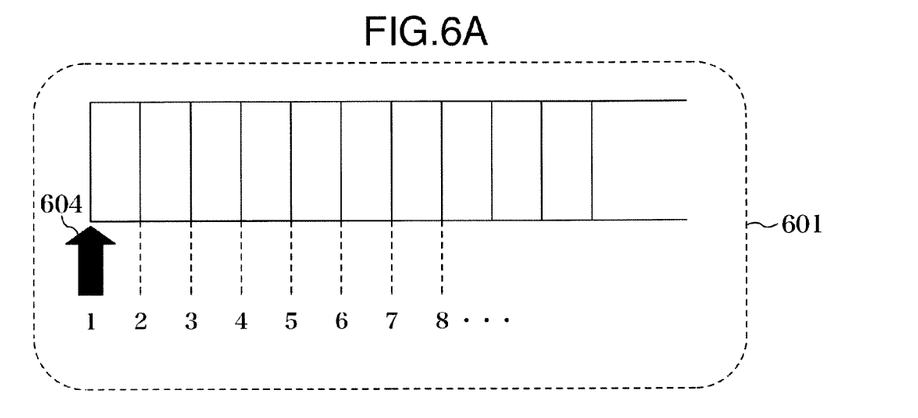
FIG. 6A is an example of a method of updating NAP after the format process.
Figure 6B:
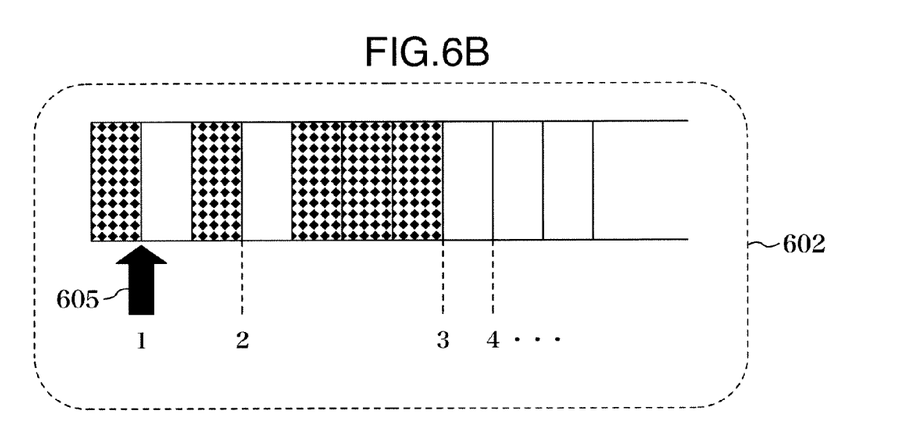
FIG. 6B is an example of a method of updating NAP after the format process.
Figure 6C:
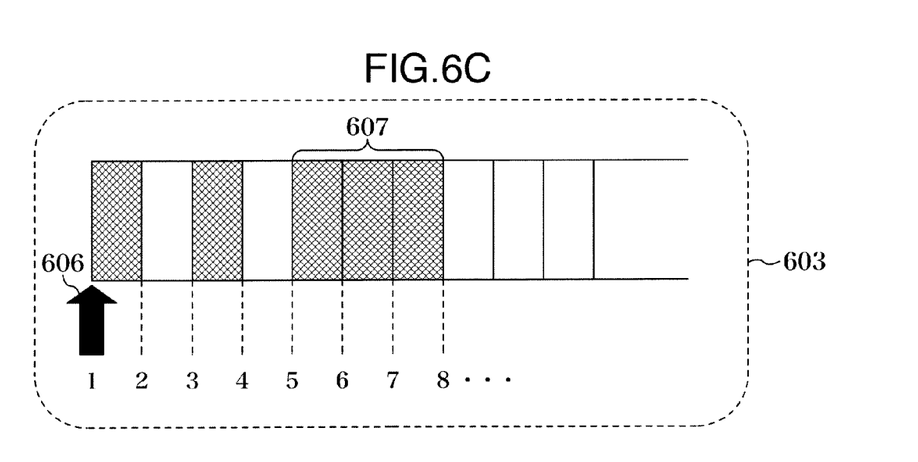
FIG. 6C is an example of a method of updating NAP after the format process.

The following describes how the NAP should be updated in performing a recording process including a replacement process for a medium including Unusable Cluster or Usable cluster Type 2 entries in a spare area with reference to FIGS. 6A to 6C. The diagram 601 illustrates a medium having no defective clusters in the spare area. If replacement data is recorded in units of a block in a replacement process, the NAP may be incremented in units of a block as indicated by the numbers in the diagram from the position 604 (1, 2, 3, 4, 5, 6, 7, 8, - - - ).

The diagram 602 illustrates a case where Unusable Cluster entries are included in the spare area. In this case, the NAP may be updated while avoiding Unusable Cluster entries in numerical order (1, 2, 3, 4, - - - ) as illustrated in the diagram from the position 605. In other words, the NAP is updated in such a way as to indicate an only usable block in the spare area. Also in the case where a part or all of the Unusable Cluster entries in the diagram 602 are of Usable Cluster Type 2, quite the same description as the above is applicable.

The diagram 603 illustrates a medium having no defective clusters in the spare area on the DFL management (the same status as the medium in the diagram 601) though defective blocks are actually present as a result of the selection of a formatting method which causes Unusable Cluster or Usable Cluster Type 2 entries to be cleared in a situation where the Unusable Cluster entries as illustrated in the diagram 602 or the Usable Cluster Type 2 entries have already been registered before the format process. In this state, a problem occurs in the case described below. It is supposed that there is an upper limit to the number of recording retries in a spare area of the record/reproduce device and the limit is, for example, two. This medium is treated as a medium having no defective cluster and therefore the position to which the NAP is initialized is a position 606 which is the same as in the example of the diagram 601. Therefore, if spare data is recorded in units of a block in a replacement process, the NAP is updated while being incremented by one. Although an area 607 is usable in the DFL entries, actually the area is likely to be an area that has been an Unusable Cluster or Usable Cluster Type 2 entry in the past, namely a defective area or an area likely to be defective, and therefore the record/reproduce device is likely to be unable to record data in this area practically. Moreover, in a situation where defective information is erased, a method of updating the NAP in a recording retry process is the same as in the diagram 601 and therefore the NAP has to be incremented to the next block.

Since three defective blocks continue in succession in the area 607, recording cannot be performed if the number of recording retires exceeds a predetermined value and therefore the recording is likely to stop due to an unsuccessful replacement process. Accordingly, in the case of performing the format process of the medium as in the diagram 602, the maximum number of blocks having contiguous Unusable Cluster or Usable Cluster Type 2 entries before a format process is stored in advance and the number of recording retries in the spare area is set to a value equal to or greater than the maximum number of blocks, thereby enabling recording into the position indicated by 8 exceeding the area 607 in the recording retry process. Naturally, there is an upper limit to the set value depending on the record/reproduce device and it is necessary to set the value so as not to exceed the limit.

As described above, in the case where a recording process is performed for a medium in which a spare area includes an Unusable Cluster or Usable Cluster Type 2 entry, the NAP is updated in such a way as to avoid clusters registered as Unusable Cluster or Usable Cluster Type 2 entries by focusing on the DFL entry registration, thereby enabling a replacement process to be performed without unnecessary retries. Moreover, the maximum number of contiguous blocks registered as Unusable Cluster or Usable Cluster Type 2 entries before the format process is figured out, and then the number of recording retries in a spare area is changed to a value within a range not exceeding a predetermined limit value in the record/reproduce device and not causing recording retry over, thereby preventing a recording stop caused by recording retry over on a specific disk.

Figure 7A:
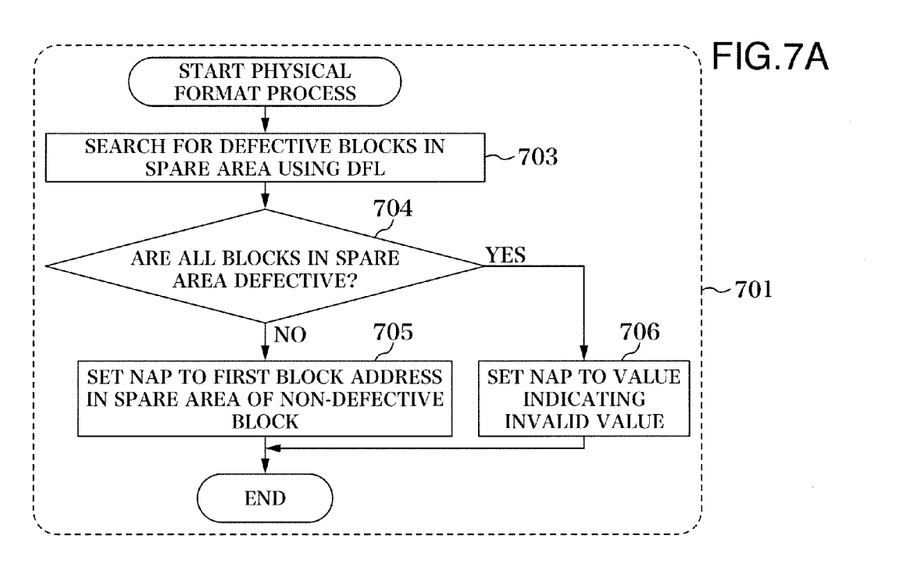
FIG. 7A is a flowchart of an example of NAP decision in a format process and in a replacement process.
Figure 7B:
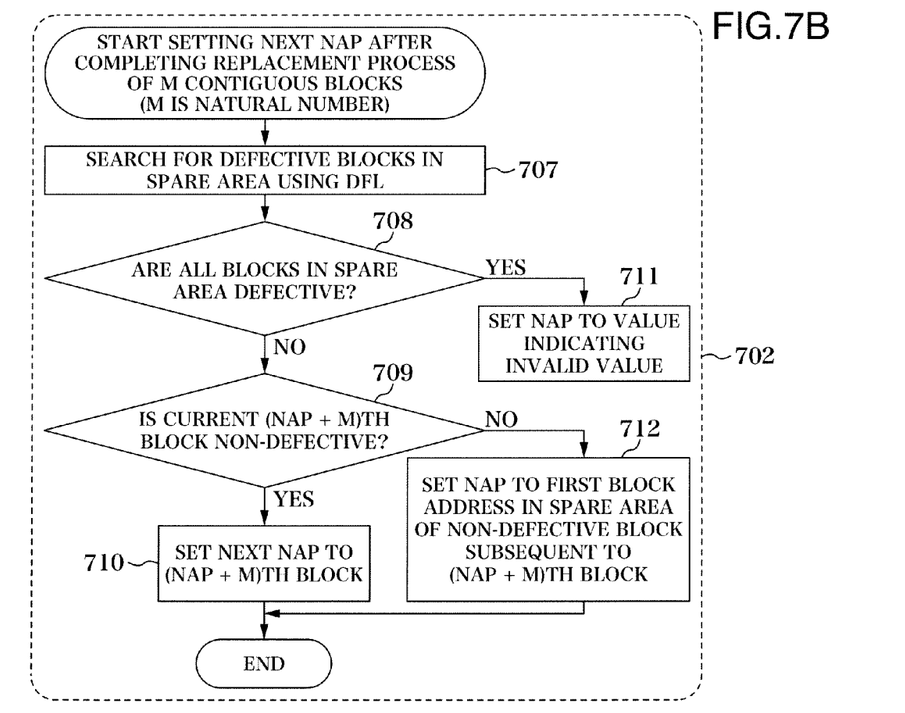
FIG. 7B is a flowchart of an example of NAP decision in a format process and in a replacement process.

Finally, an example of a flowchart in this embodiment is described with reference to FIGS. 7A and 7B.

A diagram 701 illustrates an example of a flowchart of an NAP decision method in the format process of a medium. First, defective block information in the spare area is searched for by using DFL (703). If the defective block information has already been searched for, there is no need to perform the search. In this embodiment, blocks registered as Unusable Cluster or Usable Cluster Type 2 entries correspond to defective blocks. As a result of the search, it is determined whether all blocks are defective within the spare area (704). If the answer is YES, the NAP is set to a value invalid as a block address (706). In this embodiment, the value corresponds to FFFFFFFFh. If the answer is NO, the NAP is set to a value of the first block address of the first block which is not a defective block within the spare area (705). According to the above flowchart, the value of the NAP in the format process of the medium can be decided.

A diagram 702 illustrates an example of a flowchart of an NAP decision method in a replacement process during data recording on a medium.

The flowchart is for deciding the NAP to be used next after recording spare data into M contiguous blocks (M is a natural number) in a spare area in a replacement process.

First, defective block information in the spare area is searched for by using DFL. If the defective block information has already been searched for, there is no need to perform the search (707). In this embodiment, blocks registered as Unusable Cluster or Usable Cluster Type 2 entries correspond to defective blocks. As a result of the search, it is determined whether all blocks are defective within the spare area (708). If the answer is YES, the NAP is set to a value invalid as a block address (711). In this embodiment, the value corresponds to FFFFFFFFh. If the answer is NO, it is determined whether the block located in the position obtained by adding M blocks to the current NAP position is non-defective (709). If the answer is YES, the next NAP is set to the (NAP+M)th block (710). If the answer is NO, the NAP is set to the first block address of the first block within the spare area, which is not a defective block and is subsequent to the (NAP+M)th block (712).

According to the above flowchart, the value of the next valid NAP in the replacement process of the medium can be updated.

Although this embodiment has been described taking an example of a BD-RE SL disc, naturally the same effect is achieved independently of a difference between a single layer or a multilayer.

Particularly in the multilayer disc, there is a different layer between a single layer and a multilayer or between the inner periphery side and the outer periphery side in the direction of using the spare area. There is, however, no case to be particularly considered and the present invention is applicable to all layers. Moreover, naturally the present invention is not limited to the optical disk described in the above embodiment but is applicable to other recording media as long as having a concept of a replacement process data area and of a management information storage area and the same effect is achieved in the recording media.

The preferred embodiment of the present invention has been described with reference to the diagrams hereinabove. According to the present invention, in the case where a spare area management method using the NAP of a recordable medium is applied to a spare area management method of a rewritable medium, the NAP is updated in a format process or a replacement process of the medium in such a way as to avoid blocks in the spare area registered as Unusable Cluster or Usable Cluster Type 2 entries on the DFL, thereby preventing the NAP from indicating a defective block and thus enabling a replacement process without unnecessary recording retry processes or unnecessary conversion processes on a record/reproduce medium so as to solve the problem.

The present invention is not limited to the above embodiment but includes various variations. For example, the above embodiment has been described in detail in order to facilitate understanding of the present invention and the present invention is not necessarily limited to the embodiment having all of the components described above. Moreover, a part of the components of one embodiment can be replaced with components of any other embodiment and components of one embodiment can be added to the components of any other embodiment. Further, a part of components of each embodiment can be added to, deleted from, or replaced with other components.

Moreover, even if a part or all of the above components are those of hardware, the components may be achieved by executing a program in a processor. Further, the illustrated control lines and information lines are those assumed to be necessary for description and thus all of the control lines and information lines of a product are not necessarily illustrated. Actually almost all of the components can be thought to be connected to one another.

It should be further understood by those skilled in the art that although the above description has been made on the embodiment, the present invention is not limited thereto, and various changes and modifications may be made within the spirit of the present invention and the appended claims.

REFERENCE SIGNS LIST

101 Optical disk
102 Pickup
103 Data record/reproduce means
104 Host
105 Microcomputer
106 Format process means
107 DFL entry search means
108 Replacement process means
109 NAP decision means
201 DDS
202 DFL 203 1st position of DFL
204 7th position of DFL
205 Status 1 area
206 Defective cluster first PSN
207 Status 2 area
208 Replacement Cluster first PSN
209 TDFL
210 SRRI
211 TDDS
301 Diagram for describing method of using BD spare area
302 Diagram for describing method of using spare area in BD-RE
303 Diagram for describing method of using spare area in BD-R
304 Lead-in area
305 Data zone area
306 Lead-out area
307 Spare area
308 User data area
309 OSA0
310 Recording direction
311 First block address of cluster A
312 First block address of cluster E
401 Usable Cluster Type 1
402 Replacement Cluster
403 Unusable Cluster
404 Usable Cluster Type 2
405 Status of ISA0 immediately after performing format process
406 Status after replacement process or format process
407 Configuration example of cluster status
408 Status 1 after format process
409 Status 2 after format process
410 Status 3 after format process
411 Status 4 after format process
412 to 415 Cluster within spare area in which data is to be recorded next
501 Change 1 in DFL entry status between before and after format process
502 Change 2 in DFL entry status between before and after format process
503 Change 3 in DFL entry status between before and after format process
504 to 509 NAP position in each status
601 If there is no defective cluster in spare area
602 If spare area includes Unusable Cluster entry
603 If Unusable Cluster entry has been present before format process but disappears after format process
604 to 606 Position of NAP
701 Example of flowchart of NAP decision method in format process of medium
702 Example of flowchart of NAP decision method in replacement process during data recording on medium

The invention claimed is:

1. A record/reproduce device for performing a record/reproduce operation while performing a replacement process in units of a predetermined recording block by using a rewritable medium having a user data area, a spare area, and a management information storage area which is updated at least at the time of using the spare area, the record/reproduce device comprising:
format process means for performing physical formatting of the medium;
replacement process means for performing the replacement process by using the spare area;
DFL entry search means capable of determining and searching for DFL (Defect List) entry information indicating defect type information for each block stored in the management information storage area; and
NAP decision means for deciding a first block address NAP (next available PSN) to be used next within the spare area,
wherein, in the case where a block in the spare area is determined to be defective in the format process or in the replacement process, the block is determined to be registerable in the DFL as "unusable entry"; and
wherein, in the case where the spare area includes a block of "unusable entry" in the format process of the medium, the NAP decision means decides the NAP in such a way as to avoid a first block address registered as "unusable entry."

2. The record/reproduce device according to claim 1, wherein the NAP decision means decides the NAP in such a way as to indicate the first block address which is usable first in a use direction from the first block within the spare area.

3. A record/reproduce device for performing a record/reproduce operation while performing a replacement process in units of a predetermined recording block by using a rewritable medium having a user data area, a spare area, and a management information storage area which is updated at least at the time of using the spare area, the record/reproduce device at least comprising:
format process means for performing physical formatting of the medium;
replacement process means for performing the replacement process by using the spare area;
DFL entry search means capable of determining and searching for DFL entry information indicating defect type information for each block stored in the management information storage area; and
NAP decision means for deciding a first block address NAP to be used next within the spare area,
wherein, in the case where a block in the spare area is determined to be defective in the format process or in the replacement process, the block is determined to be registerable in the DFL as "unusable entry"; and
wherein, in the format process of the medium, in the case where the block of "unusable entry" in the spare area which has been present before the format process of the medium is cleared after the format process, the NAP decision means decides the NAP in such a way as to avoid a first block address of "unusable entry" which has been registered before the format process.

4. The record/reproduce device according to claim 3, wherein, on the assumption that a block of "unusable entry" which has been registered before the format process is present, the NAP decision means decides the NAP in such a way as to indicate the first block address which is usable first in a use direction from the first block in the spare area.

5. The record/reproduce device according to claim 1, wherein, in the case of performing a recording process which includes the replacement process by using a medium including the block of "unusable entry" in the spare area, the NAP decision means decides the NAP in such a way as not to indicate the first block address of "unusable entry."

6. The record/reproduce device according to claim 1, wherein, in the case of performing a recording process which includes the replacement process by using a medium including the block of "unusable entry" in the spare area, the NAP decision means decides the NAP to be used next in such a way as to indicate only the first block address which is usable in a use direction from the first block in the spare area.

7. The record/reproduce device according to claim 5, wherein, in the format process of the medium, on the assumption that the block of "unusable entry" in the spare area which has been present before the format process of the medium is cleared after the format process and in the case where M contiguous blocks (M is a natural number) in the spare area in the use direction are registered as "unusable entries," the replacement process means sets the number of recording retries in the spare area to M or a greater value.

8. A record method of performing a record/reproduce operation while performing a replacement process in units of a predetermined recording block by using a rewritable medium having a user data area, a spare area, and a management information storage area which is updated at least at the time of using the spare area, the record/reproduce method at least wherein:
the management information storage area stores DFL entry information indicating defect type information for each block in the replacement process;
in the case where a block in the spare area is determined to be defective in a physical format process on the medium or in the replacement process, the block is determined to be registerable in the DFL as "unusable entry"; and
on the assumption that NAP is the first block address to be used next within the spare area and in the case where the spare area of the medium includes a block of "unusable entry" in the spare area of the medium in the format process, the NAP is decided in such a way as to avoid a first block address of "unusable entry."

9. The record method according to claim 8, wherein the NAP decision method includes deciding the NAP in such a way as to indicate the first block address which is usable first in a use direction from the first block in the spare area.

10. A record method of performing a record operation while performing a replacement process in units of a predetermined recording block by using a rewritable medium having a user data area, a spare area, and a management information storage area which is updated at least at the time of using the spare area, the record method at least wherein:
the management information storage area stores DFL entry information indicating defect type information for each block;
in the case where a block in the spare area is determined to be defective in a format process or in the replacement process, the block is determined to be registerable in the DFL as "unusable entry"; and
on the assumption that NAP is the first block address to be used next within the spare area and in the case where the spare area of the medium does not include a block of "unusable entry" in the spare area of the medium in the format process, the NAP is decided in such a way as to avoid a block which has been a block of "unusable entry" before the initial process.

11. The record method according to claim 10, wherein, on the assumption that a block of "unusable entry" which has been registered before the format process is present, the NAP decision method includes deciding the NAP in such a way as to indicate the first block address which is usable first in a use direction from the first block in the spare area.

12. The record method according to claim 8, wherein, in the case of performing a recording process which includes the replacement process by using a medium including the block of "unusable entry" in the spare area, the NAP decision method is used to decide the NAP in such a way as not to indicate the first block address of "unusable entry."

13. The record method according to claim 8, wherein, in the case of performing a recording process which includes the replacement process by using a medium including the block of "unusable entry" in the spare area, the NAP decision method is used to decide the NAP to be used next in such a way as to indicate only the first block address which is usable in a use direction from the first block in the spare area.

14. The record method according to claim 10, wherein, in the format process of the medium, on the assumption that the block of "unusable entry" in the spare area which has been present before the format process of the medium is cleared after the format process and in the case where M contiguous blocks (M is a natural number) in the spare area in the use direction are registered as "unusable entries," the replacement process sets the number of recording retries in the spare area to M or a greater value.

15. The reproduce method of reproducing medium, on which data is recorded in the record method of claim 8, according to the DFL.

16. The produce method of reproducing medium, on which data is recorded in the record method of claim 10, according to the DFL.

* * * * *